United States Patent [19]

Bourbeau

[11] Patent Number: 4,656,413
[45] Date of Patent: Apr. 7, 1987

[54] STABILIZED CONTROL SYSTEM AND METHOD FOR COUPLING AN INDUCTION GENERATOR TO AC POWER MAINS

[76] Inventor: Frank J. Bourbeau, 5411 Toltec Dr., Santa Barbara, Calif. 93111

[21] Appl. No.: 876,122

[22] Filed: Jun. 19, 1986

[51] Int. Cl.$^4$ .............................................. H02P 9/00
[52] U.S. Cl. ....................................... 322/47; 307/87; 322/19; 322/35
[58] Field of Search ....................... 322/19, 47, 29, 35, 322/89, 90, 32, 95; 307/87

[56] References Cited

U.S. PATENT DOCUMENTS

| | | | |
|---|---|---|---|
| 4,417,194 | 11/1983 | Curtiss et al. | 322/47 |
| 4,446,376 | 5/1984 | Baker | 307/87 X |
| 4,473,792 | 9/1984 | Nola | 322/47 |

Primary Examiner—R. J. Hickey
Attorney, Agent, or Firm—Koppel & Harris

[57] ABSTRACT

A stabilized control system and method for smoothly connecting and disconnecting an induction generator to the utility power grid is described. Thyristor switches are interposed between each phase of the mains and the generator. The thyristors are gated so as to decouple the generator from the mains for a period during each mains half-cycle, the decoupling period decreasing as the generator power factor angle increases as the generator is driven by the prime mover to its synchronous speed and above. A feedback circuit processes the generator terminal voltage to produce an analog feedback signal level proportional to the thyristor blocking voltage. The feedback signal is used to increase the thyristor gate delay angle as the generator voltage increases with increasing generator output power. This causes the rate-of-change of the generator voltage with respect to generator speed to be less than it would be with no feedback signal present. The result is increased stability margin and also reduced generator losses which increase the available generator power flow to the mains when the generator is operating at a small fraction of its rated output.

34 Claims, 10 Drawing Figures

7 1/2 HP. MACHINE OPERATING AT 1808 RPM. 404 VRMS OUT OF 480 VRMS

STABILIZED CONTROL SYSTEM AND METHOD FOR COUPLING AN INDUCTION GENERATOR TO AC POWER MAINS

BACKGROUND OF THE INVENTION

1. Field of the Invention

This invention relates to electrical power generation, and more particularly to a controller designed to connect and disconnect an induction, or asynchronous, generator driven by a random energy source, such as a wind driven turbine, to the electrical utility power mains.

2. Description of the Prior Art

Wind turbine generators are coming into more frequent use as an alternative electrical power source. Wind farms use induction generators to convert the rotary movement of a wind turbine to electrical power.

The fact that the wind velocity is random, unpredictable and subject to rapid changes complicates the manner in which the generator is connected to the AC power mains. The same problem exists for other induction generators whose energy supply is subject to random fluctuations, such as gas or liquid powered generators. Induction machines are inherently capable of operating either as generators or motors, depending on the rotational velocity of the prime mover drive. For velocities greater than the machine's synchronous speed, the machine will operate in a generating mode and provide a power output to the mains. However, for velocities below the synchronous speed, the machine will operate in a motoring mode and draw power from the mains. If adequate controls are not provided, the machine can draw more energy than it delivers under low level fluctuating wind conditions. This has led to the development of various types of switching arrangements that disconnect the machine from the mains at less than synchronous speeds, and reconnect the machine to the mains when its speed reaches synchronous or above.

In an early type of controller for a wind turbine generator, the turbine was held stationery with a brake until the wind speed exceeded a threshold level. When the threshold was exceeded, the brake was released and the generator immediately connected to the main power line with an electro-mechanical contactor. The machine then motored rapidly to synchronous speed, and was driven above synchronous speed by the turbine torque. When the wind speed dropped, a timer held the contactor closed for a pre-determined period of time before allowing the contactor to open and disconnect the generator from the power line. This type of generator control suffers from high in-rush current and starting torque, and also wastes energy by motoring when the wind speed is low.

More advanced controllers, such as those manufactured by the Vestas Corporation, operate with a free-turning propeller and utilize a pulse counting generator shaft speed sensor to signal the correct instant to close the contactor. In these devices the correct determination of the contact closure time is critical, especially if the generator is rapidly accelerating through synchronous speed. The torque-to-inertia ratio of modern wind turbine generators is very high. As a result, acceleration can reach 1,000 rpm/sec. (1 rpm/msec) at high wind velocities. Also, these induction generators are very low slip machines, with rated torque for an 1,800 rpm machine typically occurring at 1,775 rpm during motoring and 1,825 rpm during generating. Thus, at high acceleration, the typical 25 msec time lag for a contactor to close can result in the connection to the main power line being made a 1,800+(1.0 rpm/msec×25 msec)=1,825 rpm instead of the desired 1,800 rpm. The result is severe torque transient which shortens the life of the mechanical drive train.

Mains frequency deviation is another source of difficulty with controllers that rely on a shaft speed sensor to determine the instant that the generator is connected to the mains. Thus, for instance, a shift in frequency from 60 Hz to 60.5 Hz changes the synchronous speed of a four pole machine from 1,800 rpm to 1,800+1,800×0.5/60=1,815 rpm. Connecting the machine to the mains at 1,800 rpm with speed sensor control will then produce a large in-rush current and torque pulse as the machine motors up to its 1,815 rpm synchronous speed.

To cope with contactor time lag and mains frequency deviation, contemporary wind generator controllers utilize a micro-computer and complex algorithms to energize the contactor at the precise instant of time, based on speed, acceleration and mains frequency to achieve a connection to the mains at a speed as close as possible to synchronous speed.

Other modern free-turning generator controllers use a modified solid-state reduced voltage starter to connect the generator to the mains in response to a tachometer-derived control logic signal. The Westinghouse Electric Corporation 60-63PA Series, described in Operating and Service Manual for 60-63PA Series Phase Proportioning SCR Power Controller, Westinghouse Electric Corp., Oldsmar, Fla., vol. OSM108-May, 1982, is typical of this type of controller, which uses a thyristor switching arrangement between the generator and power line. A thyristor is a semiconductor device that turns on when a momentary pulse of gating current is received, and typically can be turned off only by interrupting its working current. In this type of controller, the thyristor gating is initiated at a relatively large delay angle into each half cycle of the main power line; since the thyristors are turned off when the alternating current passes through zero, the thyristors are closed for only a relatively short portion of each cycle and thereby limit the power transfer between the power line and induction machine to a low value. The thyristor gate delay angle is then ramped down to zero at a predetermined rate, resulting in the application of an increasing effective voltage to the generator with a controlled in-rush current.

Because of the relatively slow application of voltage with this controller, the thyristor gating must commence at a speed well below synchronous speed (typically 1,750 rpm) to achieve full voltage at a synchronous speed of 1,800 rpm under high acceleration conditions. Because the generator voltage remains fully on after reaching the mains voltage level, the generator will continue to operate as a motor when the wind velocity drops. The resulting motoring torque prevents the generator speeds from falling below the 1,750 rpm cut-in speed. To compensate for this, a complex system of tachometer decoding logic and timers must be used to inhibit the thyristor gating and prevent excessive power consumption when motoring in light winds. Also, a relatively expensive tachometer is necessary for the thyristor-controlled switching scheme, whether the thyristors are turned fully on initially or are ramped up to a fully on state over time.

A further improvement to the thyristor based controller is disclosed in U.S. Pat. No. 4,473,792 to Nola. This patent is directed to a controller for a single phase wind generator. A thyristor is gated on after a fixed firing delay angle late into each half-cycle of the power line. As the generator's speed increases in the vicinity of synchronous speed, the power factor angle inherently increases from less than 90° to more than 90°. By definition, this increases the current lag relative to the line voltage, causing the zero current thyristor cut-off point during each half-cycle to progressively move toward the gate delay point. As a result, the period of time during which the thyristor is on, and thus the effective generator voltage, increases with increasing speed in the vicinity of synchronous speed.

This response of generator voltage to speed in the vicinity of synchronous speed accomplishes two desirable objectives: 1. it effects a connection between the mains and the generator at synchronous speed and above without the use of any speed sensing auxiliary circuitry, and, 2. it reduces the generator losses and increases the generator power output by applying a voltage less than the mains voltage to the generator at low shaft input power levels.

A torsional instability has been observed when the single phase controller concept disclosed in U.S. Pat. No. 4,473,792 is extended to large (50+ kW) three phase wind turbine generators. This instability is caused by a very rapid change in generator voltage with speed in the vicinity of synchronous speed which is a consequence of the very rapid change in generator power factor angle with speed in high power, low slip, induction generators. The rapid change in generator voltage produces a rapid change in generator reaction torque which can excite torsional vibrations in the drive train.

An additional limitation of the control concept of U.S. Pat. No. 4,473,792 is the lack of adequate means to adjust the generator voltage vs. speed profile to optimize the generator power output. It is well known that there is an optimum operating voltage at each induction machine load point that produces maximum machine efficiency. The cited invention discloses only a means for adjusting the low speed excitation voltage. A means of adjusting the rate of change of voltage vs. speed is lacking. Thus the controller cannot be tailored to approximate the optimum voltage vs. speed profile.

SUMMARY OF THE INVENTION

In view of the above problems associated with the prior art, it is an object of the present invention to provide a novel and improved electrical generating system with a controller mechanism and method that effectively connects a three phase induction generator to the mains in a controlled and stable fashion as the machine goes through a transition from motoring to generating operation, and at the same time severely limits reverse power flow when the machine speed drops below synchronous.

Another object is the provision of such a system and method which eliminates the need for a precision tachometer and complex tachometer decoding circuitry or software.

Another object is the provision of such a system and method which connects the machine to the mains when the synchronous speed is reached, regardless of the instantaneous mains frequency.

A further object is the provision of such a system and method which limits the in-rush current and torque transient when the generator is connected to the mains shortly after being brought off-line while still generating a residual emf.

Another object is the provision of such a system and method which exhibit a small generator magnetizing current when operating at low power output, thereby increasing the available generator output power and improving the power factor.

Still another object is the provision of an adjustable generator voltage vs. speed characteristic to allow the characteristic to be modified to give minimum generator losses and maximum power output during light wind conditions.

Yet another object is the provision of such a system and method which, when used in connection with two-speed generators, enables a transition to be made from one speed to the other with a limited current and torque transient.

These and other objects are achieved with the present invention by providing a switching means between the power mains and generator, and an adjustable control means that operates the switching means so as to decouple the generator from the power line for a period during each power line half cycle, the decoupling period decreases as the generator power factor angle increases in the vicinity of synchronous speed. Means are further provided for producing a low level analog signal voltage which is proportional to the magnitude and duration of the blocking voltage of the switching means, and a feedback circuit which is responsive to the switching means blocking voltage signal to adjust the control means such that the decoupling period is decreased at a rate less than the rate of increase in the power factor angle. The result is a substantially stabilized transition between motoring and generating modes, with an overall efficient operation.

In the preferred embodiment, six thyristors arranged in anti-parallel pairs between the mains and the generator, comprise the switching means. The analog voltage signal, which is proportional to the magnitude and duration of the thyristor blocking voltages, is produced by summing the three generator terminal voltages with a resistive summing and attenuating network and processing the composite blocking voltage signal with a precision rectifier.

The gain of the thyristor blocking voltage feedback circuit is preferably made adjustable so that the rate of decrease in the decoupling period with respect to speed in the generating mode can be varied. This permits the transfer function of generator voltage with respect to speed to be adjusted to produce minimum generator losses and maximum generator output at light load where the generator voltage is less than the mains voltage.

Another feature of the generator control system is a thyristor bypass contactor which is actuated when the generator current or output power exceeds a pre-set threshold. This permits a high power generator to be connected and disconnected from the mains with thyristors of much lower power rating.

Still another feature of the generator control system is an optional low wind velocity cutoff. This removes the generator excitation when the wind velocity is too low to bring the generator up to synchronous speed.

These and other objects of the invention will be apparent to those skilled in the art from the following detailed description of the preferred embodiment, taken together with the accompanying drawings, in which:

DETAILED DESCRIPTION OF THE PREFERRED EMBODIMENT

Figure 2:
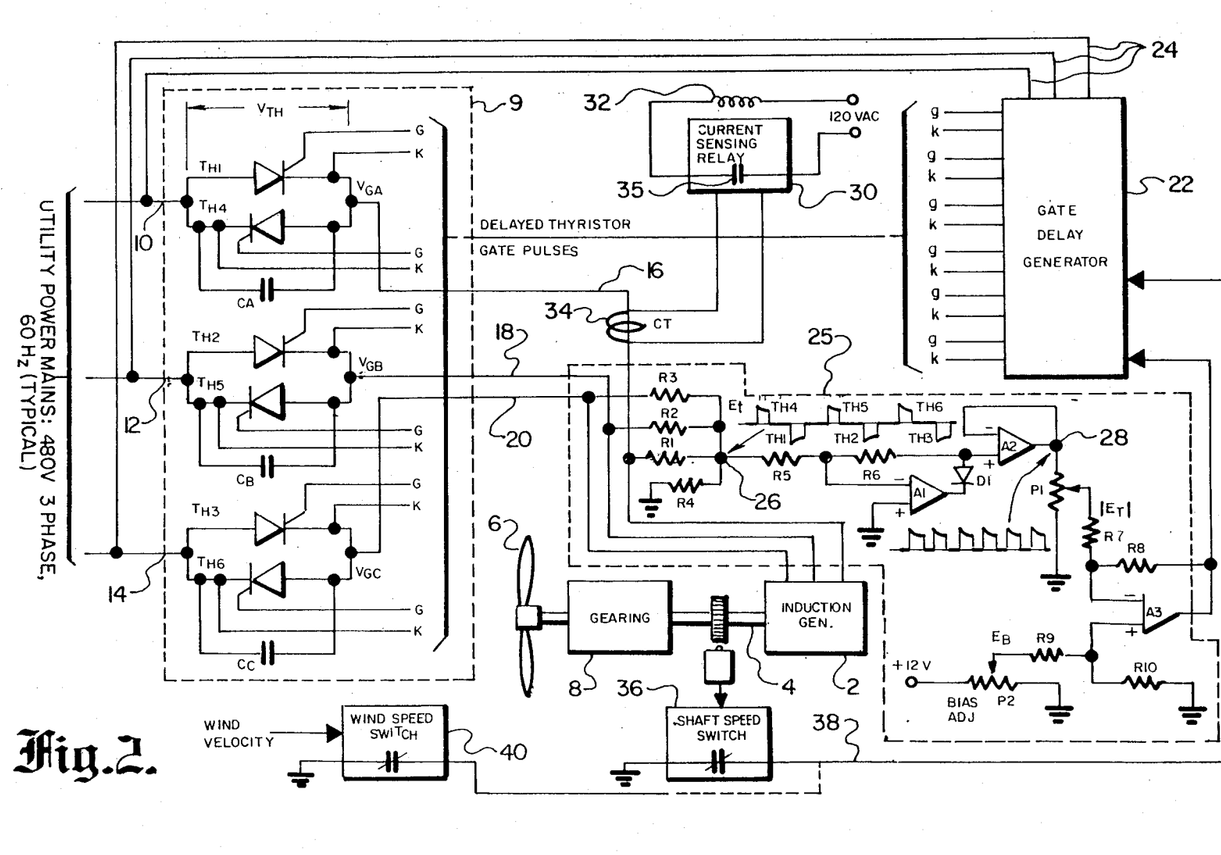
FIG. 2 is a partially schematic and partially block diagram of a wind turbine generator with the novel controller of the present invention.

A preferred embodiment of the invention is illustrated in FIG. 2. In this embodiment the invention is applied to a wind turbine generator of the type that is employed in a wind farm to generate electricity for delivery to an electrical utility power grid. An induction generator 2 has a drive shaft 4 that is rotated by means of a wind driven turbine 6 acting through a gear system 8, which typically gears down the propeller's rotational speed by a factor of 30:1.

The induction generator is connected to the electrical power mains via an intervening solid-state switching network 9. Conductors 10, 12, and 14 connect the switching network to the mains and conductors 16, 18, and 20 connect the generator to the switching network. The switching network consists of a two-way thyristor switch for each phase, which can be implemented as pairs of anti-parallel Silicon Controlled Rectifiers (SCRs) Th1–Th6 for the various phases as shown, or can be implemented as an equivalent Triac type thyristor for each phase. Each SCR pair is connected so that one SCR conducts current from its respective power line to the corresponding phase of the generator, and the other SCR conducts current in the opposite direction.

An SCR or other thyristor latches into conduction in response to a gate trigger pulse when the anode-to-cathode voltage is simultaneously positive, and thereafter remains conductive until the anode current is removed, at which time the SCR becomes an open circuit. Each SCR has a gate terminal G that can be addressed to gate the device into conduction. The various SCRs are individually gated into conduction under the control of a gate delay generator 22, which determines the individual gating time for each SCR. Suitable gate delay generators are available from Enerpro, Inc. of Goleta, Calif., model no. FCOG6100, and Westinghouse model no. VPH1019-3. These gate delay generators typically produce a set of six 60° spaced thyristor gate pulses which are delayed from the mains voltages by a phase angle in the range of 170° to 10° in response to a 1.0 to 6.0 volt input delay command signal. The gating current pulses are delivered from output lines G of the gate delay generator and cathode return lines K to the gate and cathode terminals of each SCR. Lines 24 connect each of the three power lines phases to corresponding phase reference terminals in the gate delay generator 22.

A generator voltage feedback circuit 25 is provided to eliminate torsional instability which can result from the interaction of the drive train, generator and solid-state switching network, and to allow adjustment of the generator's voltage vs. speed profile for minimum generator losses.

A detailed description of the relationship between the SCR gating pulses and generator speed, power factor angle and effective voltage is provided below. At the present time it is sufficient to state that, for a fixed delay angle between the beginning of each mains voltage half-cycle and the production of a corresponding SCR gating pulse, the SCR conduction angle will increase as the generator power factor angle increases from less than 90° to more than 90° as the generator is driven from less than synchronous speed to more than synchronous speed by the wind turbine. It can be shown that the SCR conduction angle will reach 180° when the generator power factor angle increases to equal the SCR gate delay angle. See F. Khater, D. Novotny, "An Equivalent Circuit Model for Phase Back Control of AC Machines", Proc. of 1985 IEEE/IAS Meeting, Toronto, Canada, Vol. Ch2207-9/85/0000-0798, pgs. 798–804. The result is that the effective generator voltage will increase from a preset (or "prebias") level at low generator speed to the full mains voltage level at some speed above synchronous speed.

Generator lines 16, 18 and 20 are connected to resistors R1, R2 and R3 which are terminated in an common node 26 which is in turn connected to resistor R4. The other terminal of resistor R4 is connected to ground. Typical resistor values are 2.0 megohm for R1, R2 and R3 and 15 kohm for R4. The resistors R1–R4 form a voltage divider circuit which attenuates the generator phase volages and sums the attentuated voltages at node 26. The signal voltage $E_t$ appearing across resistor R4 represents the summation of low level replicas of the generator phase voltages. However, with a balanced three-phase system, the sum of the generator phase voltages with the SCRs fully conductive is zero. Thus the $E_t$ signal represents imbalances in the generator phase voltages resulting from the blocking states of SCRs Th1–Th6. The result is a signal voltage of alternating pulses at three times the mains frequency. The width of each $E_t$ signal pulse is equal to the SCR blocking angle and the amplitude of each pulse if proportional to the amplitude of the SCR blocking voltage. A sequence of such pulses is illustrated in FIG. 2 next to node 26, with each pulse identified by its corresponding SCR. With a 60 Hz three-phase mains voltage, the SCR blocking voltage signal, $E_t$, will be a 180 Hz waveform with a peak voltage of about 0.0075 times the peak SCR blocking voltage $E_t$ could also be produced with a summing transformer excited from the SCR blocking voltages.

Node 26 is connected to a precision signal rectifier comprising operational amplifiers A1 and A2 in conjunction with equal valued high resistance resistors R5 and R6 and diode D1. The high resistance of resistor R5 causes the precision signal rectifier circuit to have a negligible loading effect on the signal summing circuit R1, R2, R3, and R4. The rectifier converts the $E_t$ signal into a rectified voltage signal characterized by a DC level and 360 Hz ripple voltage. The rectified signal is illustrated in FIG. 2 next to output node 28 from the precision rectifier.

The rectified SCR blocking voltage signal is applied to a potentiometer P1 to produce an attenuated blocking voltage signal, $|E_t|$ the magnitude of which can be controlled by adjusting the setting of potentiometer P1. A second potentiometer P2 produces a bias signal $E_b$. The attenuated SCR blocking signal and the bias signal are applied to gate delay generator 22 as the gate delay angle command signal. This control input to the gate delay generator determines the magnitude of the gate delay angle for the SCRs. A pair of resistors R7 and R8 are connected between the output of potentiometer P1 and the output of amplifier A3, with the inverting input to the amplifier taken from the junction of the two resistors. A second pair of resistors R9 and R10 are connected between the output of potentiometer P2 and ground, with the non-inverting input to amplifier A3 taken from the junction of those resistors. The values of resistors R7–R10 are chosen to produce a typical gain of 3.0 for amplifier A3.

Potentiometers P1 and P2 are adjusted to produce the desired generator prebias AC voltage for operation below synchronous speed, to set the speed above synchronous at which the generator voltage reaches the power line voltage, and to provide adequate stability margin. The setting of potentiometer P2 primarily controls the prebias voltage. This voltage must be high enough to ensure that the SCRs become fully conductive when the generator speed passes through synchronous under high acceleration, but not so high as to produce excessive motoring torque or system power loss when the generator speed drops below synchronous. Potentiometer P1 is adjusted to make the generator voltage reach the mains voltage at the desired generator power output level or speed. Potentiometer P1 thus controls the slope of the generator voltage VS. speed transfer function. The setting of potentiometer P1 must be high enough to avoid instability under light wind conditions, but not so high that excessive speed is required for the generator to reach full voltage.

For very high power levels, expensive high power SCRs and bulky heat exchangers to cool the SCRs must be provided. It then becomes cost-effective to use a 3-pole contactor to bypass the SCRs at high current levels. In this way, SCRs rated at, say, 100 amperes can be used in conjunction with a 300 ampere rated contactor to bring a 300 ampere generator gently on and off line, with the SCRs being bypassed by the contactor when the generator is operating in the 100 ampere to 300 ampere current range. The unique property of the SCR controller in preventing high power or current levels when the generator is operating at less than synchronous speed simplifies the control of the bypass contactor. Thus the power monitoring circuitry normally used in a wind turbine generator operational controller can be adapted to furnish the control power required to energize the bypass contactor, or a current sensing relay can be used for the purpose.

The circuit diagram of FIG. 2 illustrates the use of a current sensing relay 30 to control an SCR bypass contactor consisting of contacts CA, CB and CC and contactor magnet coil 32. The sensing element of the current sensing relay is connected to current transformer 34 which provides a secondary current proportional to the generator current. The normally open control contact 35 of the current sensing relay is connected to apply 120 Vac (typical voltage) to the magnet coil of the SCR bypass contactor when the current threshold level of the current sensing relay is exceeded.

It is desirable that the prebias voltage be removed from the generator to avoid unnecessary power consumption and SCR heating when the wind velocity is insufficient to drive the generator to synchronous speed. To this end a simple speed switch 36, such as Synchro-Start Company Model ESSC, senses the rotational velocity of the generator shaft and delivers an enable signal over line 38 to the gate delay generator 22. Typically, the speed switch would be set so that the gate delay generator is enabled for wind speeds greater than about 10 mph, with the gate delay generator disabled and the SCRs opened for lesser wind speeds. Alternately, a wind speed switch 40 can be provided to detect the wind velocity directly and provide a corresponding signal over enable line 38.

The circuitry between the generator output conductors 16, 18, 20 and the gate delay generator 22 functions as a feedback circuit that adjusts the gate delay angle controller to progressively increase the gate delay angle as the generator power factor angle approaches the gate delay angle, but at a lesser rate than the increase in the power factor angle. Since the generator power factor angle increases with increasing speed in the synchronous speed region, increasing the gate delay angle at a lesser rate results in a progressive decrease in the decoupling periods (during which the generator terminals are disconnected from the mains by the SCRs) at a rate which is likewise less than the rate of increase in the power factor angle. The rate at which the gate delay angle is increased as a function of power factor angle is controlled by potentiometer P1, which can be adjusted to produce an optimum setting.

Figure 3:
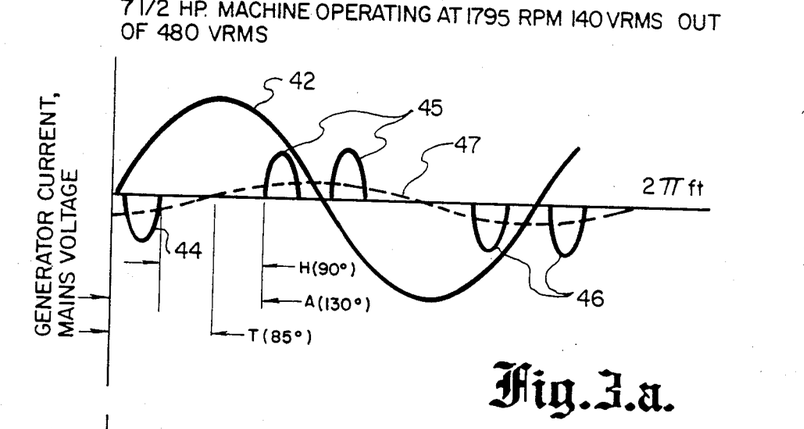
FIGS. 3(a), 3(b) and 3(c) are graphs illustrating the generator current and mains voltage, thyristor blocking voltage and generator voltage, respectively, for a generator speed just below synchronous.
Figure 4:
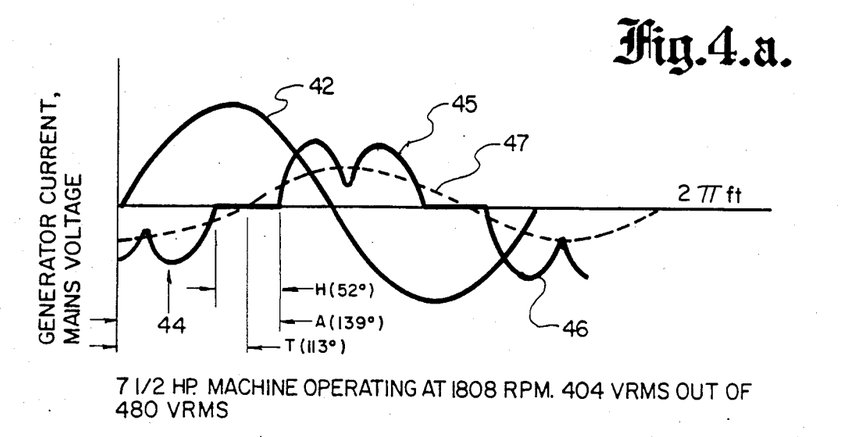
FIGS. 4(a), 4(b) and 4(c) are graphs illustrating the generator current and mains voltage, thyristor blocking voltage and generator voltage, effectively, for a generator speed greater than synchronous.

The operation of the gate delay generator, and the dependence of the effective generator voltage upon the power factor angle and the SCR gate delay angle, are illustrated in FIGS. 3 and 4 by the waveform of voltage and current vs. the phase angle in radians, $2\pi$ ft, where f is the mains frequency in Hertz and t is the time in seconds. These waveforms are traced from generator voltage and current oscillograms for a four pole 7½ hp machine operating under SCR control from 480 V mains and driven by a variable speed dc motor to simulate the wind turbine. In FIG. 3, the generator is driven to a speed of 1,795 rpm which results in a power factor angle T of 85°. The controller provides an SCR gate delay angle A of 130°. In FIG. 4, the generator is driven to 1,808 rpm which results in a power factor angle of 113° and a gate delay angle of 139°.

Referring to FIG. 3a, the mains voltage 42 is a sinusoidal waveform, whereas the generator current is divided into pairs of time-spaced pulses 44, 45 and 46 which alternate in polarity with the same overall wavelength as the mains voltage. FIG. 3b illustrates the SCR blocking voltage and FIG. 3c illustrates the machine phase voltage, again with the machine operating at slightly less than synchronous speed.

The power factor angle T is defined as the phase displacement of the fundamental component of machine current with respect to the mains voltage. It can be shown that the fundamental component of current, indicated as the dashed curve 47 in FIG. 3a, has its zero crossing at the mid-point between the second pulse of the negative current pulse-pair 44 and the first pulse of the positive pulse-pair 45. This power factor angle is measured from the traced oscillogram of FIG. 3a as 85°. The power absorbed or delivered by the machine is $\sqrt{3}$EIcos(T), where E is the mains RMS voltage and I is the RMS value of the machine fundamental component of current. Since the power factor angle indicated in FIG. 3a is 85° and cos (85°)=0.087, machine power is positive, tending to produce motoring torque. This is expected since the machine speed is 1,795 rpm or 5 rpm less than the synchronous speed.

With the SCRs gated at a large delay angle, as illustrated by FIG. 3, the magnitude of the torque-producing fundamental component of current is very low and the power factor angle is only slightly less than 90°. Hence the power absorbed by the machine is insufficient to maintain rotation in the absence of torque input from the prime mover. Thus if wind velocity falls below the threshold velocity necessary to maintain the machine speed at synchronous speed, the machine will not absorb enough power, or provide enough torque, to sustain rotation and the speed will drop to a level commensurate with the reduced wind velocity. This is in contrast with conventional generator controllers which maintain the connection between the machine and the mains for a substantial period of time after the wind velocity falls below the synchronous speed threshold, resulting in the absorption of a substantial amount of motoring energy which reduces the generator's net energy production.

Referring to FIG. 4a for the case of super-synchronous speed operation, the mains voltage 42 is a sinusoidal waveform, as in the sub-synchronous speed case shown in FIG. 3a. However, the current pulse pairs 45 have broadened into double-humped single pulses. The fundamental component of the current is sketched as the dashed waveform 47 in FIG. 4a. The fundamental component is seen to lag the mains voltage by a power factor angle T of 113°. Since cos (113°)=0.391, the machine power is negative, indicating generator operation. The SCR blocking voltage, displayed in FIG. 4b, shows a narrower pulse width and reduced amplitude, indicating that a greater fraction of the mains voltage is available for application to the machine operating as a generator. This is confirmed by FIG. 4c which shows the machine voltage as a composite of the mains voltage 42 and the generator counter EMF 48 which appears at the generator terminal during the holdoff angle H.

The effect of the generator voltage feedback circuit 25 of FIG. 2 on the SCR gate delay angle during the transition from sub-synchronous to super-synchronous speed is seen by comparing the waveforms of FIGS. 3a and 4a. Thus, in FIG. 3a, operation at 1,795 rpm results in the power factor angle of 85° and a SCR gate delay angle of 130°. Driving the machine to 1,808 rpm by increasing the prime mover output torque causes a shift in power factor angle to 113° and an increase in the SCR gate delay angle to 139°, as seen in FIG. 4a. Thus the transition from sub-synchronous to super-synchronous speed produced an increase in power factor angle of 113°−85°=28° and an increase in SCR gate delay angle of 139°−130°=9°. Referring to the generator voltage feedback circuit 25 of FIG. 2, an increase in the setting of potentiometer P1 would increase the gain of feedback circuit and cause a greater change in SCR gate delay angle per degree of change in generator power factor angle as the generator power output is increased.

Figure 5:
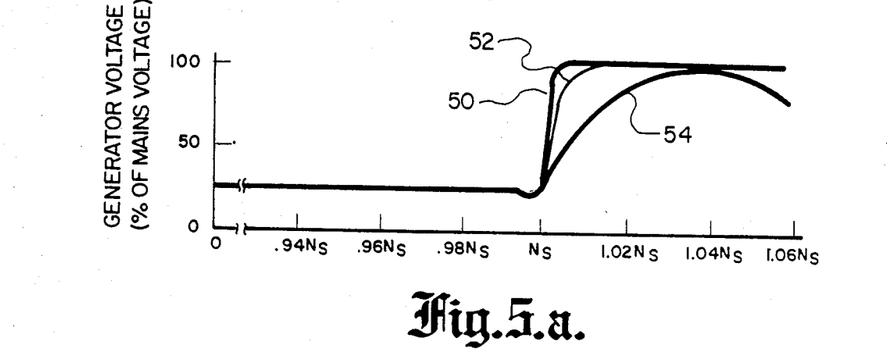
FIGS. 5(a) and 5(b) are graphs illustrating various generator voltage-speed and generator torque-speed curves, respectively, available with the present invention.

Typical plots of the effective generator voltage vs. generator speed are given in FIG. 5a for various settings of the feedback control potentiometer P1. The steepest curve 50 results from a zero setting for P1, such that the feedback circuit has no effect. This very rapid rise in generator voltage with increasing speed can produce undesirable oscillations and instability.

Curve 52 shows the effect of a moderate setting for feedback control potentiometer p1. The generator voltage rises at a more moderate rate, avoiding the previous oscillation and instability problems, but still providing a highly efficient transition between motoring and generating modes.

Figure 1:
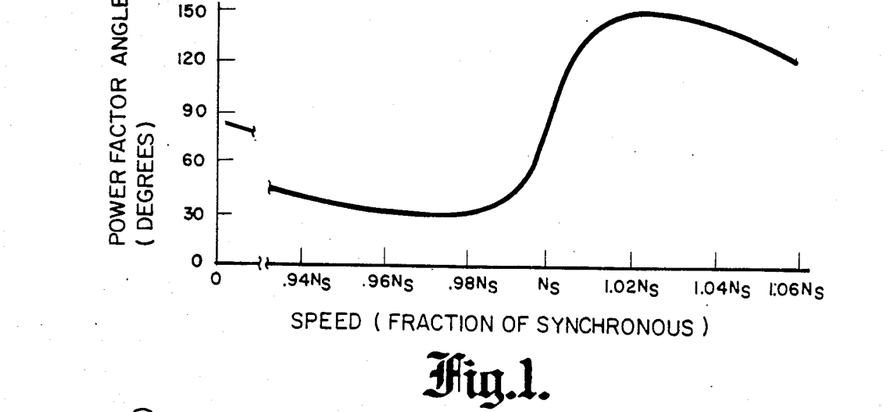
FIG. 1 is a graph relating power factor angle to rotational speed for a typical induction machine.

An excessive setting for potentiometer P1 that results in too high a feedback level is illustrated by curve 54. While there are no oscillation problems in this case, the generator voltage rises so slowly that the peak in the power factor angle-speed curve (FIG. 1) is passed before full voltage has been attained.

Generator torque vs. speed for the three settings of feedback control potentiometer P1 are shown in FIG. 5b. Here we note that the application of full mains voltage to the generator would produce a nearly linear relationship between torque and speed in the region from zero to rated torque. For the case of a zero setting of feedback control potentiometer P2, the generator voltage reaches the mains voltage level with a very small change in speed above synchronous speed $N_s$. Thus the torque vs. speed curve 56 for this condition is an approximate straight line as shown in FIG. 5b.

The moderate setting for feedback control potentiometer P1 and the more gradual increase of generator voltage vs. speed that it produces causes the torque vs. speed curve 58 of FIG. 5b to deviate slightly from a straight line. Torque vs. speed curves 56 and 58 converge at a speed of $1.01N_s$ because the generator voltage with potentiometer P1 adjusted to a moderate feedback setting reaches the mains voltage at this speed.

Torque vs. speed curve 60 of FIG. 5b shows the case for feedback potentiometer P1 adjusted for an excessive feedback level. Thus, compared to curves 56 and 58, a significantly higher speed is required to produce a given torque for speed in the range of $N_s$ to $1.04N_s$. For generator speed exceeding $1.04N_s$, the decreasing voltage curve 54 of FIG. 5a produces the rapid decrease in torque shown in curve 60 of FIG. 5b. The result is a runaway condition which forces the generator to be shut down.

While particular embodiments of the invention have been shown and described, numerous modifications, and alternate embodiments will be apparent to those skilled in the art. Accordingly, it is intended that the inventjion be limited only in terms of the appended claims.

I claim:

1. A controller for stabilized coupling of an induction generator to an alternating current (AC) power mains, comprising:

switching means electrically connecting the power mains to the generator to transmit power therebetween, said switching means being adapted to switch on for current conduction between the AC power line and the generator in response to a gating signal, and to switch off in response to a lack of current flow, adjustable control means connected to provide a gating signal to the switching means after a predetermined initial gate delay angle during each half cycle of the AC power mains voltage, means for sensing the switching means blocking voltage, and feedback means responsive to the sensed blocking voltage for adjusting the control means to progressively increase the gate delay angle as the generator power factor angle approaches the gate delay angle, the gate delay angle increasing at a lesser rate than the increase in power factor angle to stabilize transitions between motoring and generating modes of operation.

2. The controller of claim 1, the switching means comprising thyristor switches.

3. The controller of claim 1, wherein the AC power mains, generator, switching means and adjustable control means are provided in a multi-phase format such that the power line phase voltages sum to zero at any particular time for balanced line conditions, and the means for sensing the switching means blocking voltage is connected to sense the effective generator voltage.

4. The controller of claim 3, the switching means comprising thyristor switch means.

5. The controller of claim 4, the feedback means including means for scaling the sensed generator voltage, means for rectifying the scaled voltage, and means responsive to the rectified voltage signal for adjusting the control means.

6. The controller of claim 5, the AC power line, generator, thyristor switch means and adjustable control means being provided in three-phase format, wherein the scaling means compromises a voltage divider means connected to sum scaled replicas of the three generator phase voltages, and the rectifying means comprises means for rectifying the summed voltages.

7. The controller of claim 1, further comprising means for electrically bypassing the switching means, means for sensing the generator current, and means for actuating the switch bypass in response to the sensed current exceeding a predetermined high power level.

8. The controller of claim 1, further comprising means for electrically bypassing the switching means, means for sensing the generator power, and means for actuating the switch bypass in response to the sensed current exceeding a predetermined high power level.

9. The controller of claim 1, wherein the feedback means includes adjustable means for controlling the rate of gate delay angle increase as a function of the generator power factor angle.

10. The controller of claim 1, the AC power mains generator, switching means and adjustable control means being provided in a three-phase format.

11. A controller for stabilized coupling of an induction generator to an alternating current (AC) power mains, comprising:
switching means electrically connecting the power mains to the generator to transmit power therebetween,
means for sensing the generator power factor angle,
adjustable control means for operating the switching means to decouple the generator from the power line for a period during each power line half cycle, the decoupling period as the generator power factor angle increases in the vicinity of its synchronous speed, and
feedback means responsive to the sensed power factor angle for adjusting the control means to decrease the decoupling period at a rate less than the rate of increase in the power factor angle, thereby stabilizing transitions between motoring and generating modes of operation.

12. The controller of claim 11, the power factor angle sensing means comprising means for sensing the effective generator voltage.

13. The controller of claim 11, the switching means comprising a thyristor switch means.

14. The controller of claim 11, the means for sensing the generator power factor angle comprising means for sensing the switching means blocking voltages.

15. The controller of claim 14, wherein the AC power mains, generator, switching means and adjustable control means are provided in a multi-phase format such that the power line phase voltages sum to zero at any particular time for balanced line conditions, and the means for sensing the thyristor blocking voltages comprises means for sensing the effective generator voltages.

16. The controller of claim 11, wherein the feedback means includes adjustable means for controlling the rate of decrease in the decoupling period as a function of the generator power factor angle increases.

17. The controller of claim 11, the AC power line, generator, switching means and adjustable control means being provided in three-phase format.

18. The controller of claim 12, further comprising means for sensing the generator current, and means responsive to the sensed current exceeding a high power threshold for bypassing the switching means.

19. The controller of claim 12, further comprising means for sensing the generator power, and means responsive to the sensed power exceeding a high power threshold for bypassing the switching means.

20. A method for stabilized connection of an induction generator to an alternating current (AC) power mains, comprising:
coupling the generator to the AC power mains,
decoupling the generator from the AC power mains during each half cycle of the power line for a decoupling period, and
decreasing the decoupling period decreasing with increasing generator power factor angle, but at a rate less than the rate of increase in power factor angle.

21. The method of claim 20, further comprising the steps of generating a gating signal during each half cycle of the power mains, coupling the generator to the AC power mains during each half cycle in response to the gating signals, and decoupling the generator from the AC power mains in response to a lack of current flow.

22. The method of claim 20, wherein the generator and AC power mains are in three-phase format, and each phase of the generator is coupled to and decoupled from a corresponding phase of the AC power mains during each half cycle of that phase.

23. The method of claim 20, wherein the generator power factor angle is sensed by sensing the effective generator voltage.

24. The method of claim 20, further comprising the steps of sensing the generator current, and continuously coupling the generator to the AC power mains in response to the current exceeding a high power threshold.

25. The method of claim 20, further comprising the steps of sensing the generator power, and continuously coupling the generator to the AC power mains in response to the power exceeding a high power threshold.

26. An electrical generating system for supplying power to an alternating current (AC) power mains, comprising:
an induction generator which is driven by a shaft,
means for rotating the generator shaft,
switching means electrically connecting the power mains to the generator to transmit power therebetween, means for sensing the generator power factor angle, adjustable control means for operating the switching means to decouple the generator from the power mains for a period during each power mains half cycle, the decoupling period decreasing as the generator power factor angle increases in the vicinity of its synchronous speed, thereby effectively connecting the generator to the power mains for a greater portion of each half cycle and a corresponding greater power transmission at generating speeds above the synchronous speed than during a motoring mode at speeds below synchronous, and feedback means responsive to the sensed power factor angle for adjusting the control means to decrease the decoupling period at a rate less than the rate of increase in the generator power factor angle, thereby stabilizing transitions between motoring and generating modes of operation.

27. The electrical generating system of claim 26, said means for rotating the generator shaft being wind driven to increase the shaft rotational velocity with increasing wind velocity.

28. The electrical generating system of claim 26, further comprising means for sensing the wind velocity, and means responsive to the sensed wind velocity falling below a threshold level for opening the switching means.

29. The electrical generating system of claim 26, said switching means being adapted to switch on for current conduction between the AC power mains and the generator in response to a gating signal from the control means, and to switch off in response to a lack of current flow.

30. The electrical generating system of claim 29, the switching means comprising a thyristor switch means.

31. The electrical generating system of claim 26, the power factor angle sensing means comprising means for sensing the switching means blocking voltages.

32. The electrical generating system of claim 31, wherein the AC power mains, generator, switching means and adjustable control means are provided in a multiphase format such that the power mains phase voltages sum to zero at any particular time for balanced line conditions, and the means for sensing the thyristor blocking voltages comprises means for sensing the effective generator voltages.

33. The electrical generating system of claim 26, wherein the feedback means includes adjustable means for controlling the rate of decrease in the decoupling period as the generator power factor angle increases.

34. The electrical generating system of claim 26, the AC power mains, generator, switching means and adjustable control means being provided in three-phase format.

* * * * *